May 26, 1931. J. B. GALBRAITH 1,807,156
CHUCK
Filed Aug. 23, 1927
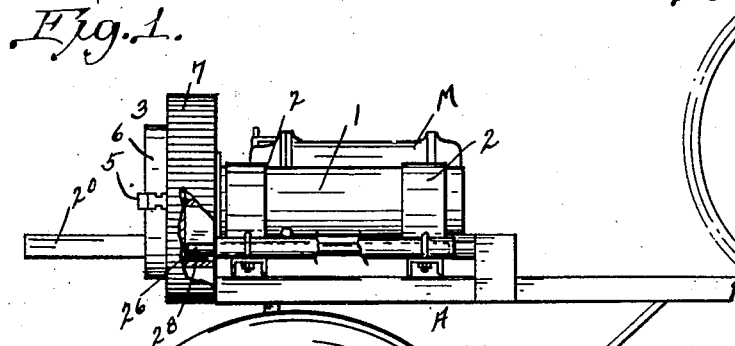
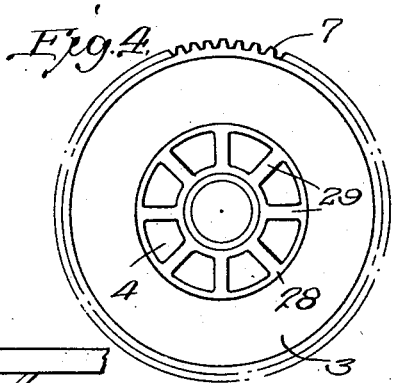
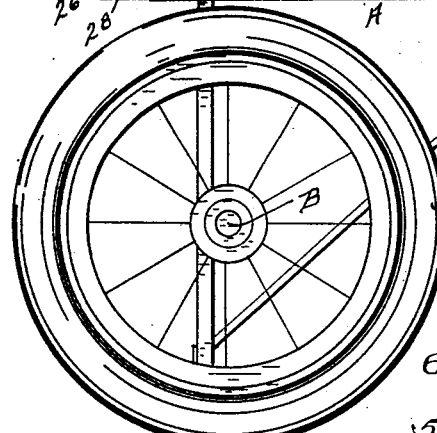
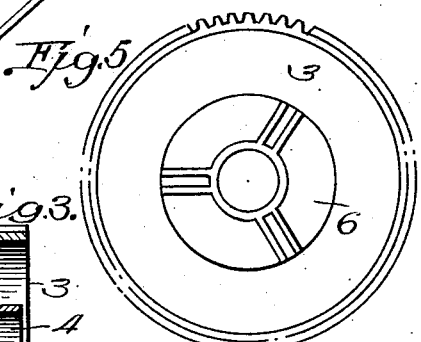
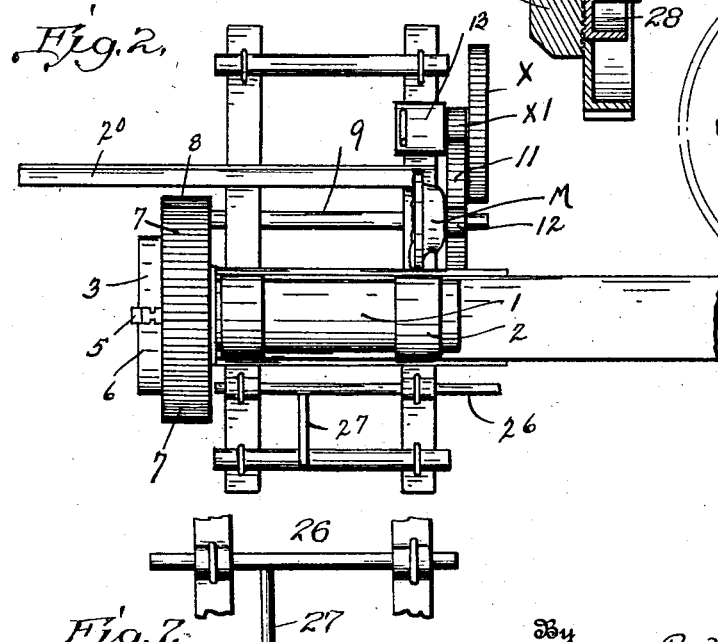
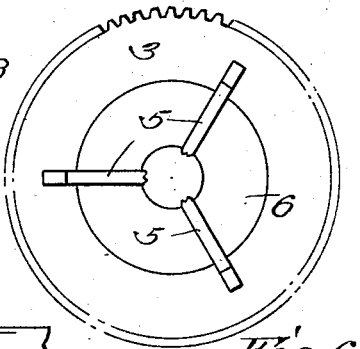
Inventor
Joseph B. Galbraith
By R. M. Thomas
Attorney Patented May 26, 1931

1,807,156

UNITED STATES PATENT OFFICE

JOSEPH B. GALBRAITH, OF KAYSVILLE, UTAH

CHUCK

Application filed August 23, 1927. Serial No. 214,833.

My invention relates to chucks and has for its object to provide a new and efficient light weight chuck for use on pipe working machines, which chuck is operated by a scroll plate and which plate may be stopped by a sliding bar engaging with the scroll plate to stop the rotation thereof engaging work in the chuck.

This object I accomplish with the device illustrated in the accompanying drawings, in which similar numerals and letters of reference indicate like parts throughout the several views and as described in the specification forming a part of this application and pointed out in the appended claim.

In the drawings in which I have shown the best and most preferred manner of building my invention. Figure 1 is a side view of the machine, with parts left off from the machine to make the showing clearer. Figure 2 is a plan view of the machine with the motor partially cut away. Figure 3 is a section of the chuck used in my machine. Figure 4 is a back view of the chuck. Figure 5 is a back view of the chuck body with the scroll plate removed. Figure 6 is a front view of the chuck. Figure 7 is a plan view of the chuck stop and tightener.

In the drawings I have shown the frame upon which the machine is mounted and carried as A and which frame is supported on an axle B supported by wheels C to facilitate in moving the machine from one location or job of work to another. The axle and wheels can be removed and the machine set upon the floor. A cylindrical body member 1 is mounted on suitable bearings 2 on the frame A and a chuck 3 is secured on one end of the said body 1. The said chuck 3 is made by a scroll plate 4 acting on the back side of jaws 5 carried in an extended portion 6 of the chuck. The outer perimeter of the said chuck is formed into a gear wheel 7 which meshes with another gear wheel or pinion 8. The said pinion 8 is secured on a shaft 9 which is rotatably mounted in suitable bearings. Another gear wheel 11 is mounted on the other end of the said shaft 9 and meshes with a pinion 12, which pinion is carried on the drive shaft of a motor M. The said motor is mounted on the frame and is the power unit of the machine. A set of coacting back gears and pinion X is mounted on the frame A in the eccentric bearing 13, which, when meshing with the pinion 12 on the motor shaft, also mesh with the gear 11 on the extreme end of the shaft 9. This arrangement of gears and pinions when in use allows for a change in speed of the machine and also for a step-up in the power thereof. The said pinion 12 is slidable on the motor shaft so that it will mesh with either the gear wheel 11 of the set of gears X. A slidable stop bar 20 is provided on one side of the said machine extending front beyond the line of the front of the chuck, which bar is the tool support and on which the tools rest when working on pipe being turned in the machine. The motor M is provided with a switch which shifts the brushes in the motor to vary the rotation in either direction as desired or to stop the motor and to provide a reversible motor so that work may be done and then the tools removed by reversing the motor. This switch also regulates the speed of the motor.

A sliding chuck tightener rod 26 is provided on one side of the machine and has a handle 27 thereon to move the rod in either direction as desired.

The chuck as shown in the drawings is made with a scroll threaded plate 4, having a flange 28 therearound and with radial ribs 29 formed between the hub of the plate and the flange and to stop the rotation of the scroll plate and either tighten or loosen the jaws of the chuck on a piece of work the machine is rotated and the rod 26 is moved by the handle 27 into contact with one of the said ribs 29 which stops the scroll plate and actuates the jaws 5, moving them to or away from the work, depending on the direction of the motor, to either tighten or loosen the work in the chuck.

The operation of my machine is as follows:

To place a pipe in the chuck for work it is passed through the cylindrical member 1 into and through the chuck. The motor is then started and the rod 26 moved into contact with one of the ribs 29, stopping the scroll plate and actuating the jaws 5. The jaws 5 move inwardly until they come into contact with the pipe and the motor is then stopped and the rod 26 moved backward. The motor is then again started and the work to be done on the pipe may be done with any of the well-known tools, which tools rest upon the bar 20. When the work has been completed, the switch is moved and the motor reversed, which will then reverse the work, removing the tool from the pipe. To release the pipe from the chuck the rod 26 is then engaged with the ribs 29 and the motor started in the reverse direction, which moves the jaws 5 outwardly, releasing the pipe.

In using the machine with the receding dies, the motor does not have to be reversed to remove the tool, and to remove the pipe from the chuck the rod may simply be moved into contact with one of the ribs 29, which stops the scroll plate and releases the pipe from the chuck.

Having thus described my invention, I desire to secure by Letters Patent and claims:—

In a device of the class described the combination of a chuck secured to the end of a rotatably mounted cylindrical member; teeth on the outer perimeter of said chuck; a gear to mesh with said teeth; means to drive said gear in either direction; a scroll plate in said chuck having a flange on the back side thereof with radial members integral therewith; and a chuck stop, consisting of a slidable rod, having a handle thereon, mounted in suitable bearings adapted to engage with said radial members on the scroll plate to stop said plate when engaged therewith, to automatically tighten or loosen the jaws of said chuck as desired.

In testimony whereof I have affixed my signature.

JOSEPH B. GALBRAITH.